(12) United States Patent
Watanabe et al.

(10) Patent No.: US 11,171,532 B2
(45) Date of Patent: Nov. 9, 2021

(54) MOTOR STATOR

(71) Applicant: YAMADA MANUFACTURING CO., LTD., Kiryu (JP)

(72) Inventors: Satoshi Watanabe, Kiryu (JP); Daisuke Kiryu, Kiryu (JP); Masahiko Hoshino, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 92 days.

(21) Appl. No.: 16/744,455

(22) Filed: Jan. 16, 2020

(65) Prior Publication Data

US 2020/0313492 A1 Oct. 1, 2020

(30) Foreign Application Priority Data

Mar. 27, 2019 (JP) ................................ JP2019-60119

(51) Int. Cl.
*H02K 3/52* (2006.01)
*H02K 3/34* (2006.01)
(Continued)

(52) U.S. Cl.
CPC .............. *H02K 3/52* (2013.01); *H02K 1/146* (2013.01); *H02K 3/34* (2013.01); *H02K 3/46* (2013.01);
(Continued)

(58) Field of Classification Search
CPC .... H02K 3/522; H02K 1/146; H02K 2203/12; H02K 3/12; H02K 3/345; H02K 3/325;
(Continued)

(56) References Cited

U.S. PATENT DOCUMENTS

2010/0181863 A1* 7/2010 Murakami ............. H02K 3/522
310/215
2017/0141634 A1* 5/2017 Honda ................... H02K 1/146
(Continued)

FOREIGN PATENT DOCUMENTS

DE 102012224153 A1 6/2014
DE 102013106999 A1 1/2015
(Continued)

OTHER PUBLICATIONS

German Search Report dated Sep. 28, 2020, includes report letter in English from German associate, 8 pages.

*Primary Examiner* — Quyen P Leung
*Assistant Examiner* — Alexander A Singh
(74) *Attorney, Agent, or Firm* — Rankin, Hill & Clark LLP

(57) ABSTRACT

A wind portion of an insulator includes a side surface at the same side as, in a circumferential direction, a second guide surface which is orthogonal to a holding surface capable of holding a coil and which guides a winding in an inner-diameter direction, and an end surface orthogonal to the side surface. A first corner formed at a boundary between the holding surface and the side surface as viewed in the axial direction of a motor stator is located at a guiding-direction side by a first guide surface relative to a second corner formed at a boundary between the first guide surface and the second guide surface. The winding is extended from the second corner to the first corner.

2 Claims, 11 Drawing Sheets

(51) Int. Cl.
*H02K 3/46* (2006.01)
*H02K 1/14* (2006.01)

(52) U.S. Cl.
CPC ......... *H02K 3/522* (2013.01); *H02K 2203/12* (2013.01)

(58) Field of Classification Search
CPC .. H02K 1/12; H02K 3/46; H02K 3/34; H02K 3/50; H02K 15/095; H02K 3/38; H02K 3/52; H02K 3/28; H02K 3/487; H02K 3/493
USPC .......................................... 310/214, 215, 71
See application file for complete search history.

(56) References Cited

U.S. PATENT DOCUMENTS

2019/0305626 A1* 10/2019 Miyata .................. H02K 3/522
2020/0259385 A1* 8/2020 Hishida .................. H02K 21/16

FOREIGN PATENT DOCUMENTS

| | | |
|---|---|---|
| DE | 112014006488 T5 | 12/2016 |
| DE | 102018217852 A1 | 4/2020 |
| JP | 2014-236651 | 12/2014 |
| JP | 2014-236651 A | 12/2014 |

* cited by examiner

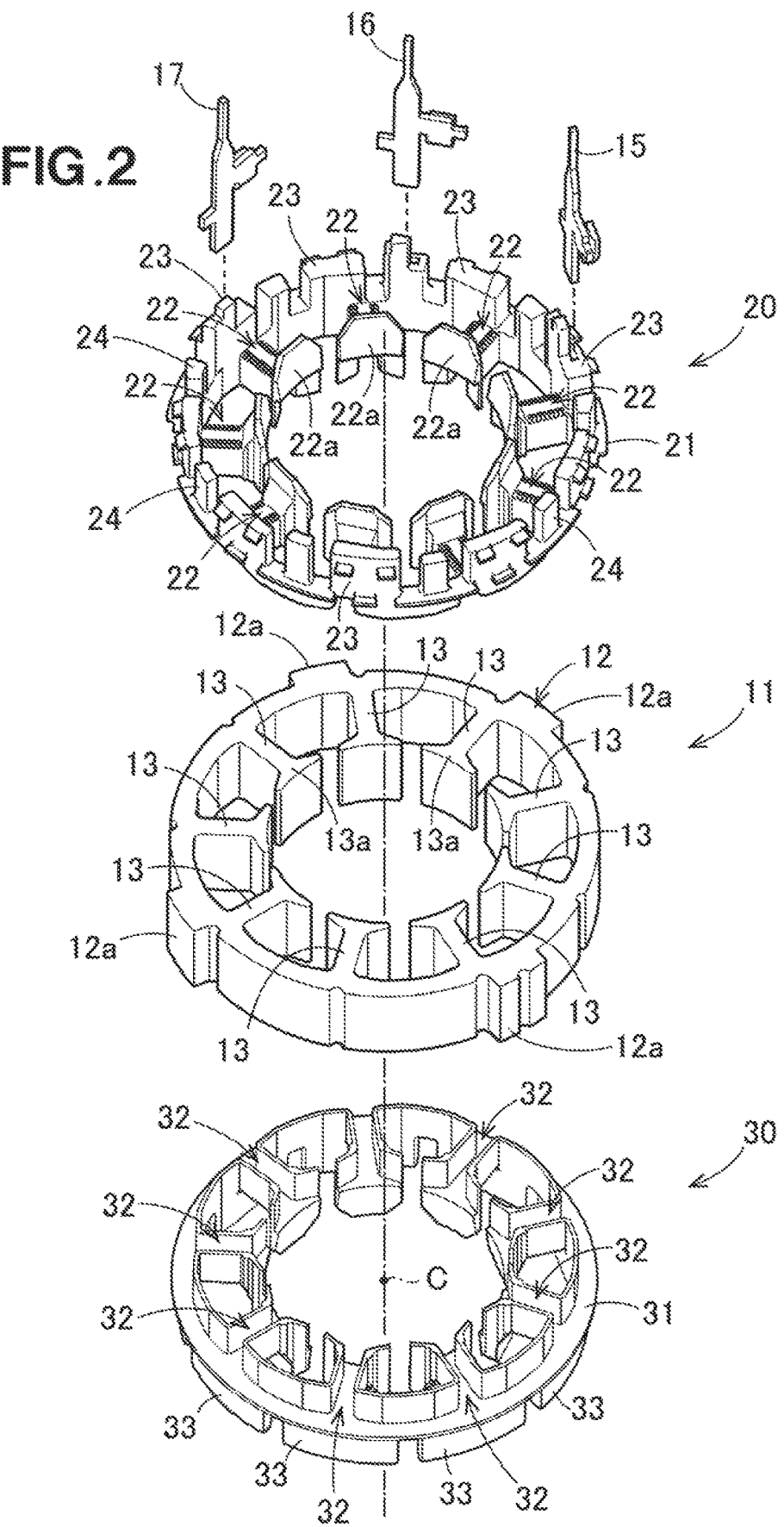

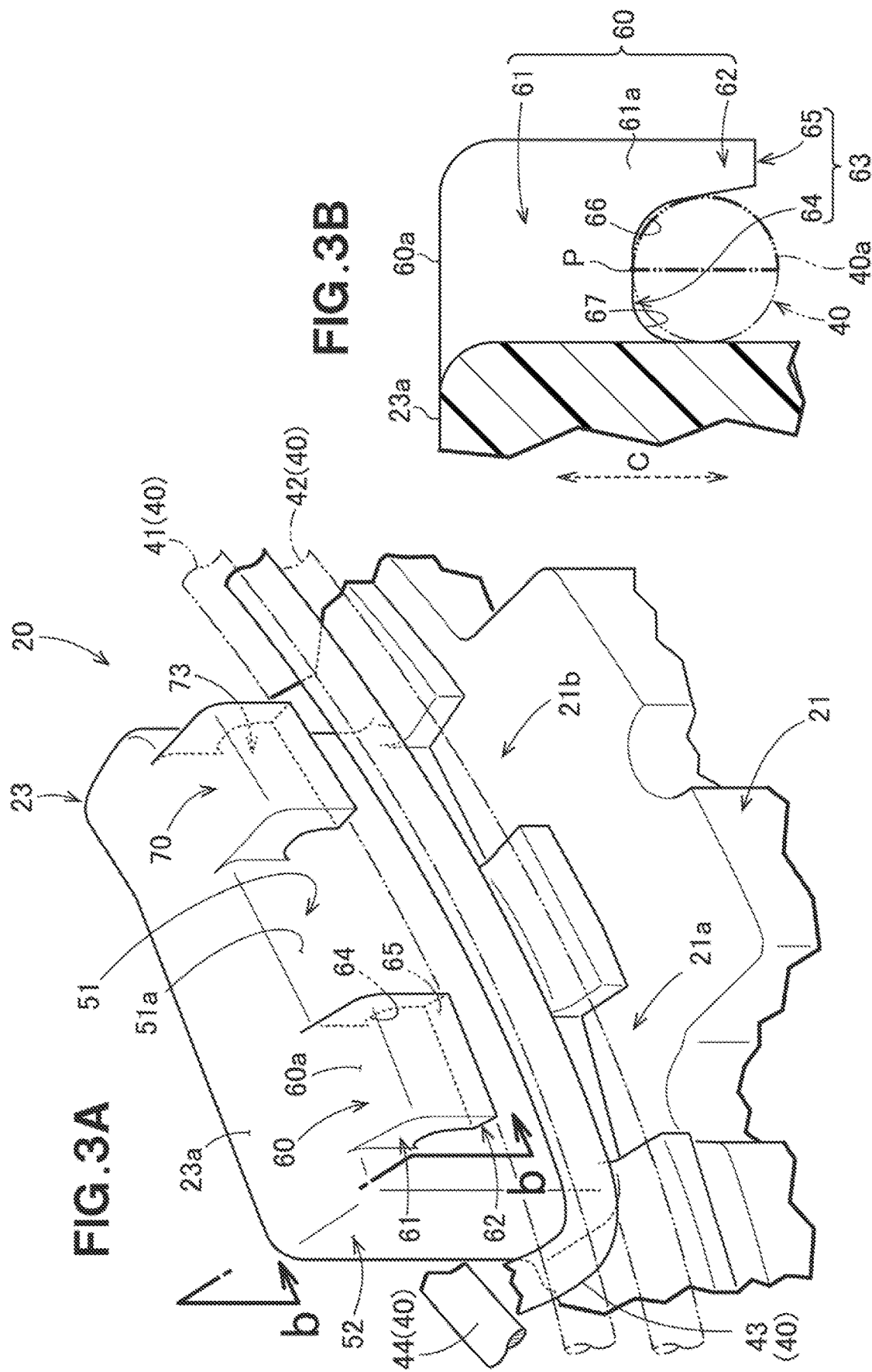

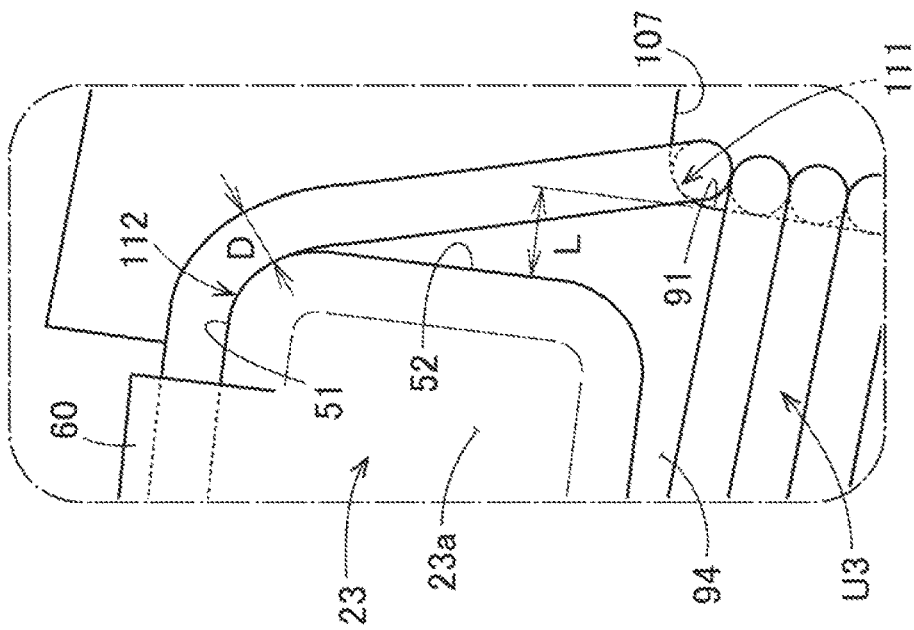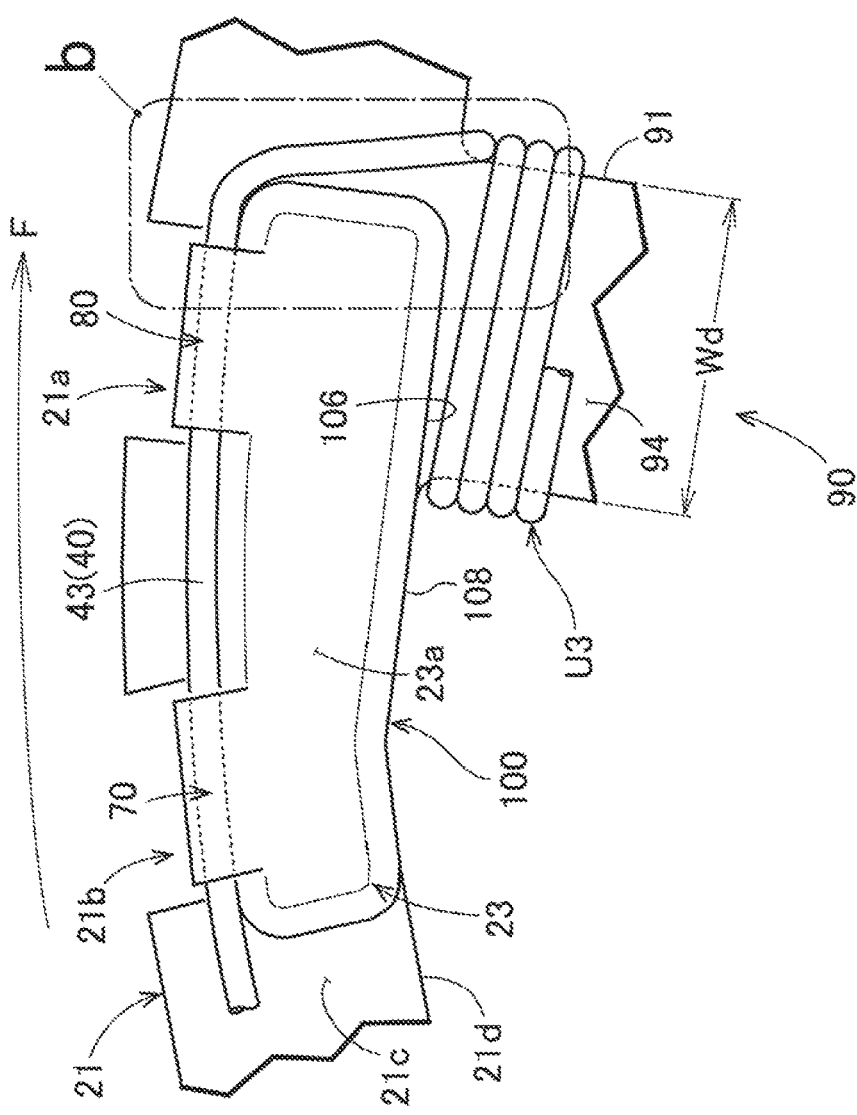

FIG.6
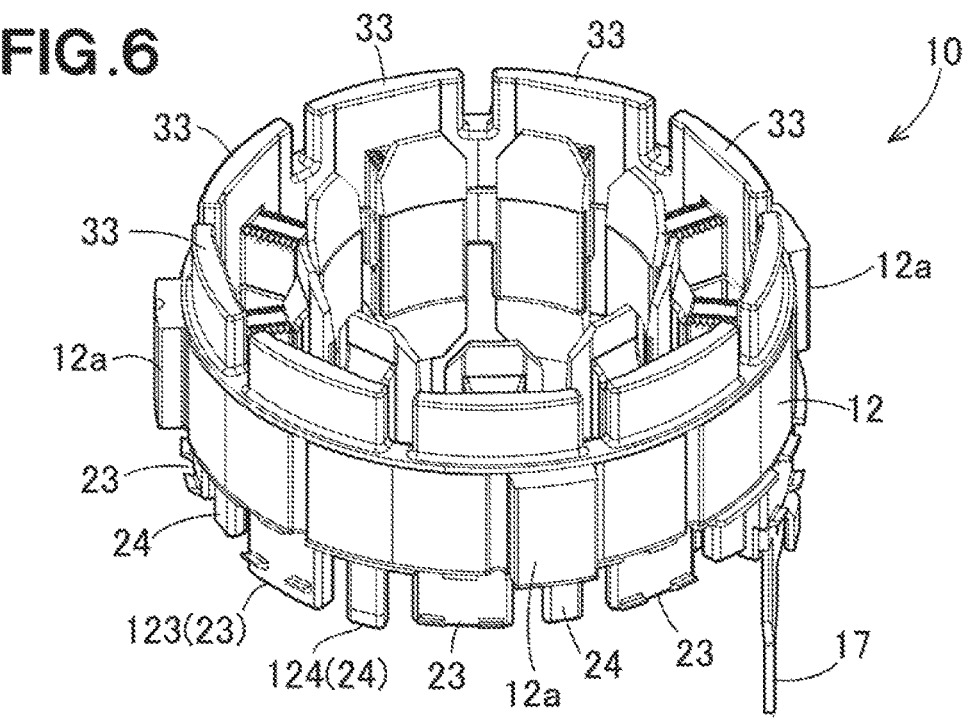
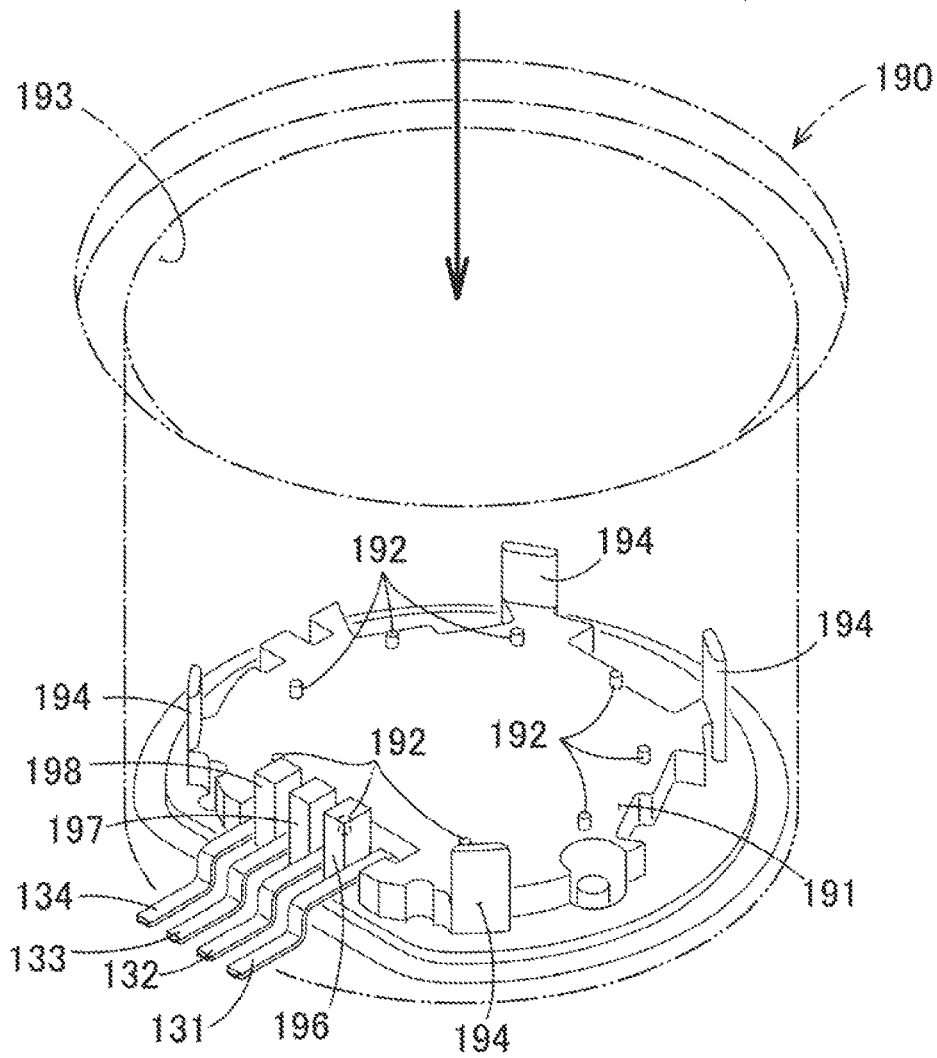

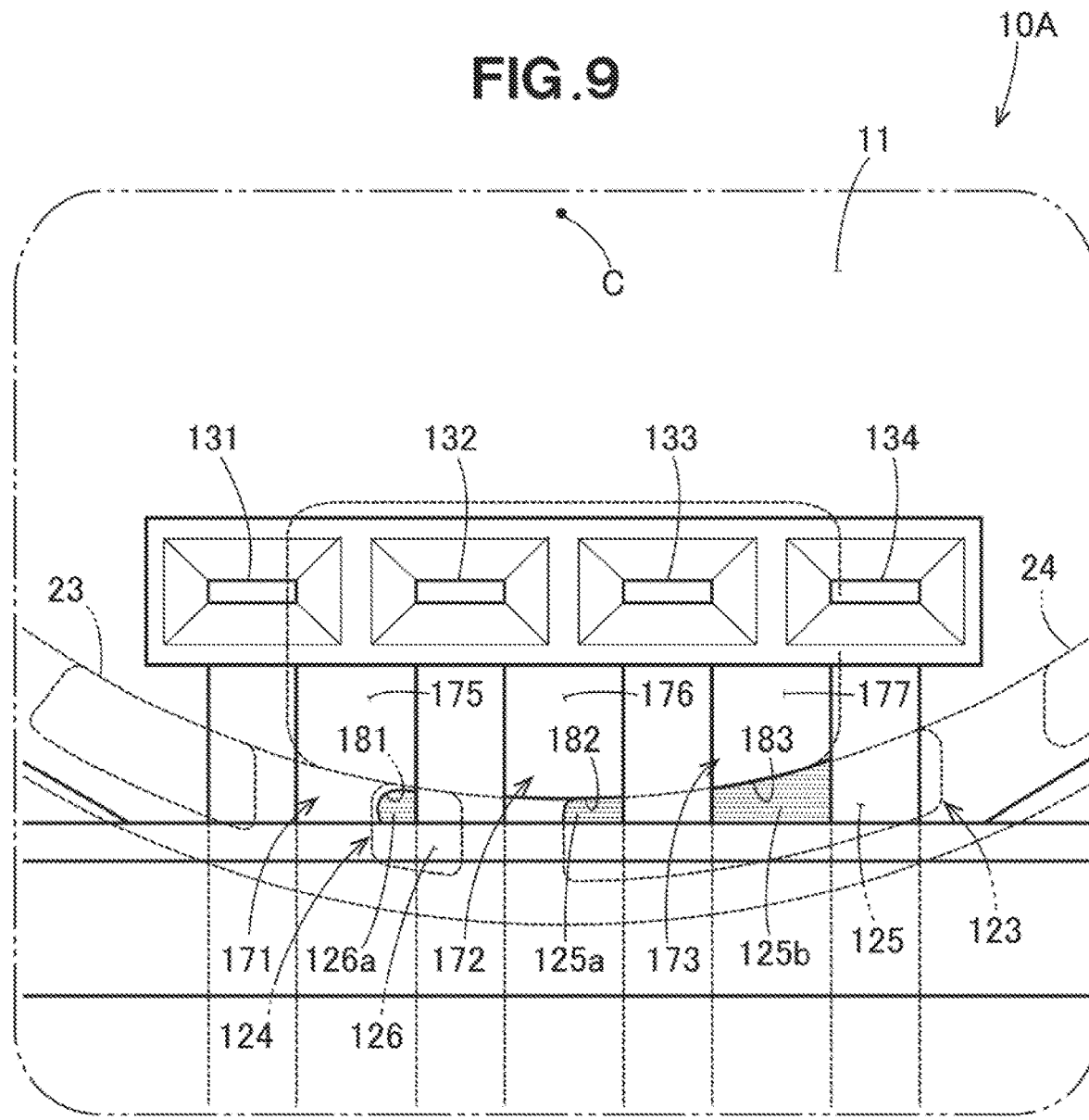

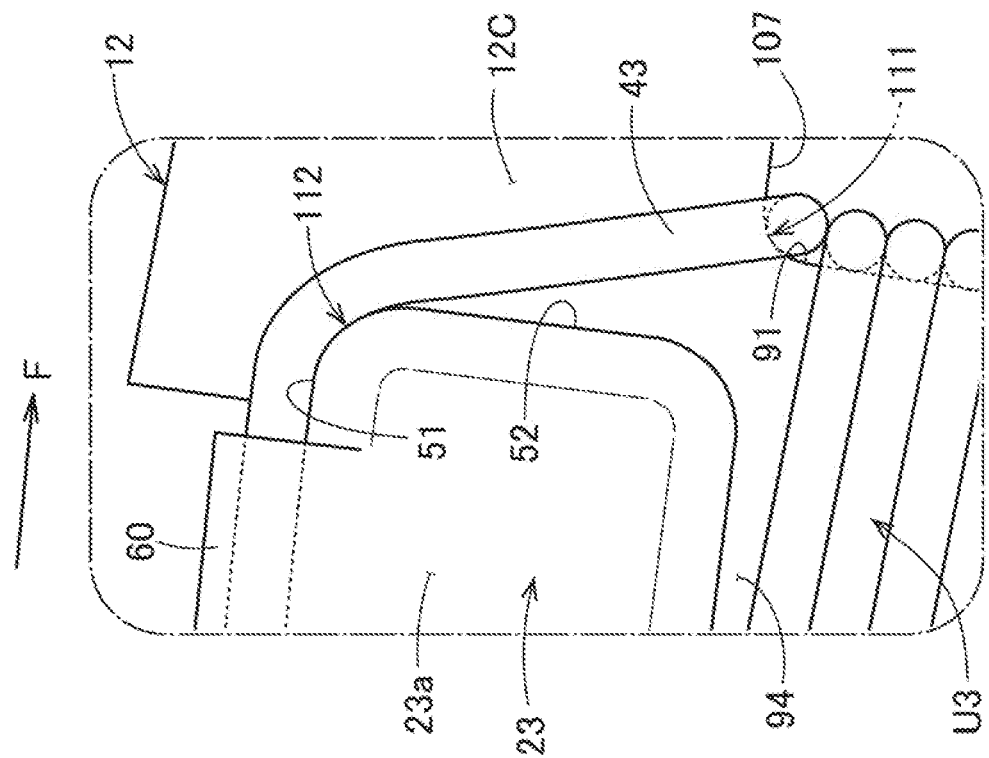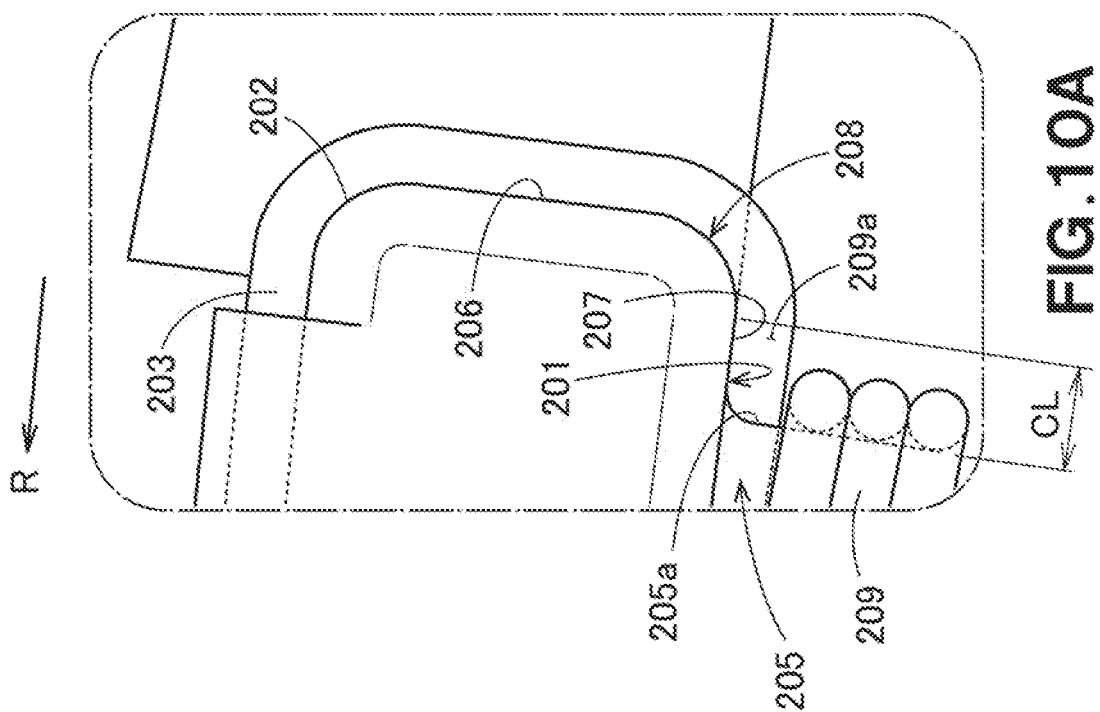

MOTOR STATOR

FIELD OF THE INVENTION

The present disclosure relates to a motor stator that includes a coil formed by a winding drawn in an inner-diameter direction from an outer circumference side.

BACKGROUND

A motor stator includes a core, an insulator attached to the core, and a winding wound around the insulator. JP 2014-236651 A discloses a conventional technology relating to a motor stator.

According to the motor stator disclosed in JP 2014-236651 A, six cores are arranged in the circumferential direction. An insulator (a bobbin) attached for each core includes a plurality of wind portions which extend in the radial direction of the motor stator and around which the winding is wound, a single annular member provided at respective end portions of the plurality of wound portions at the outer-diameter side, and a flange provided at an end portion of each wind portion at the inner-diameter side.

The flange is a portion that is a start of the winding. When the winding is wound around the wind portion from the flange toward the inner circumference surface of the annular member, the winding at the first stage is formed. Next, the winding is wound around the wind portion from the inner circumference surface of the annular member toward the flange, and thus the winding at the second stage is formed. Similarly, the winding is wound around the wind portion repeatedly and bidirectionally between the flange and the annular member, and thus the coil is formed.

JP 2014-236651 A

SUMMARY OF THE INVENTION

Some motor stators have the coil that is formed by causing the winding to be wound at the first stage around the wind portion from the outer-diameter side toward the inner-diameter side. If the winding at the first stage that forms the coil can be wound so as to intimately in contact with the wind portion, the winding strings at the subsequent stages laid over on the winding strings on the first stage can be intimately in contact with each other. Consequently, the shape of the coil can be held without a collapse, and thus the space factor of the winding wound around the wind portion increases.

An objective of the present disclosure is to provide a technology that improves the space factor of a winding wound around an insulator.

A motor stator according to a first embodiment of the present disclosure includes:

a core;

an insulator covering the core; and a coil formed by a winding wound around the insulator, wherein the core comprises: an annular yoke, and a tooth extended from the yoke in an inner-diameter direction of the motor stator, the insulator includes: an annular member covering the yoke; a wind portion which covers the tooth and around which the winding is wound; and an extended portion extended from the annular member in an axial direction of the motor stator, wherein an inner circumference surface of the annular member includes a holding surface which abuts an end portion of the coil and which is capable of holding a shape of the coil, wherein the extended portion includes: a first guide surface guiding the winding in a circumferential direction of the motor stator; and a second guide surface which adjoins to the first guide surface and which guides the winding from the first guide surface to the wind portion, wherein the wind portion includes: a side surface at a same side as the second guide surface in the circumferential direction; and an end surface orthogonal to the side surface, wherein a first corner formed at a boundary between the holding surface and the side surface as viewed in the axial direction of the motor stator is located at a guiding-direction side by the first guide surface relative to a second corner formed at a boundary between the first guide surface and the second guide surface, and wherein the winding is extended from the second corner to the first corner.

According to a second embodiment of the present disclosure, preferably, the second guide surface is in parallel with the side surface of the wind portion; and a dimension in the circumferential direction from the second guide surface to the side surface is greater than a half of a wire diameter of the winding, and is smaller than a dimension obtained by subtracting the wire diameter from a half dimension of the end surface in the circumferential direction.

According to the above-described first embodiment, the insulator includes the annular member covering the yoke, a wind portion which covers the tooth of the core and around which the winding is wound, and the extended portion extended from the annular member in the axial direction of the motor stator. The inner circumference surface of the annular member includes the holding surface abutting the end portion of the coil and capable of holding the shape of the coil.

The extended portion includes the first guide surface guiding the winding in the circumferential direction of the motor stator, and the second guide surface which adjoins to the first guide surface and which guides the winding from the first guide surface to the wind portion. A boundary between the holding surface and the side surface of the wind portion will be defined as the first corner. A boundary between the first guide surface and the second guide surface will be defined as the second corner. The first corner is located at the guiding-direction side by the first guide surface relative to the second corner.

Accordingly, when the winding is drawn in the inner-diameter direction, the winding can be extended from the second corner to the first corner without a contact with the extended portion. When the winding is about to be wound around the wind portion, the winding can contact not only the holding surface but also the side surface of the wind portion. That is, the winding-start portion of the winding at the first stage forming the coil can be intimately in contact with the wind portion, and thus the entire winding at the first stage can be surely wound around the wind portion. Consequently, the space factor of the winding increases.

According to the above-described second embodiment, the second guide surface of the extended portion of the insulator is in parallel with the side surface of the wind portion, and a dimension in the circumferential direction from the second guide surface to the side surface is greater than a half of a wire diameter of the winding, and is smaller than a dimension obtained by subtracting the wire diameter of the winding from a half dimension of the end surface of the wind portion in the circumferential direction. Such a predetermined dimension prevents the winding drawn in to form the coil from interfering with the winding drawn out from the coil.

BRIEF DESCRIPTION OF THE DRAWINGS

FIG. 2 is an exploded perspective view of the motor stator illustrated in FIG. 1A;

FIG. 3A is a diagram for describing an extended portion of an insulator illustrated in FIG. 1, and FIG. 3B is a cross-sectional view taken along a line b-b in FIG. 3A;

FIG. 5A is a diagram for describing the extended portion and the wind portion both illustrated in FIG. 4, and FIG. 5B is an enlarged view of a portion b in FIG. 5A;

FIG. 6 is a diagram for describing a process of sealing a stator main body illustrated in FIG. 1A by a sealing member;

FIG. 9 is a plan view of the motor stator illustrated in FIG. 8;

FIG. 10A is a diagram showing a motor stator according to a comparative; and FIG. 10B is a diagram showing an advantageous effect according to the first embodiment;

DETAILED DESCRIPTION OF THE EMBODIMENTS

Figure 1A:
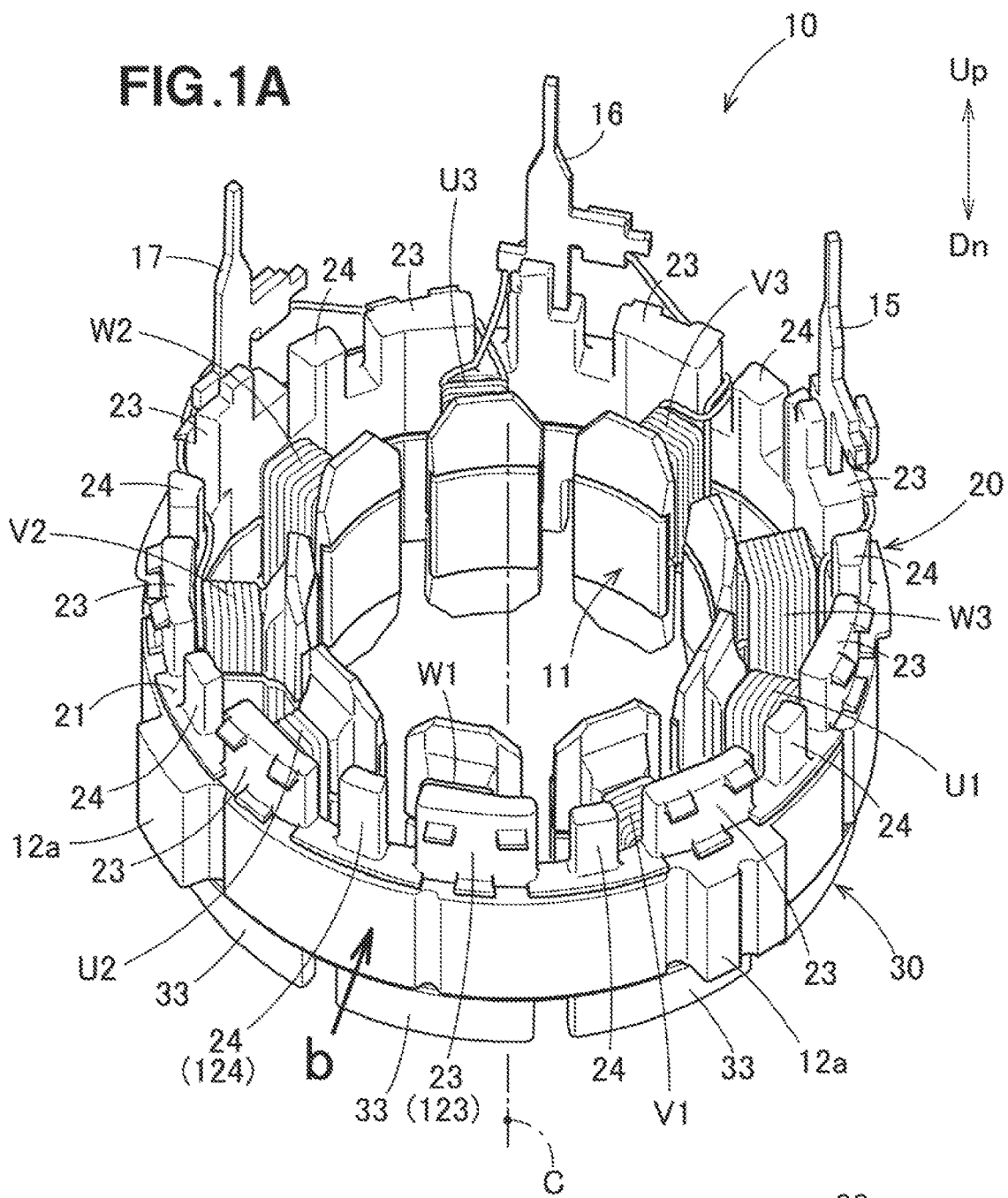
FIG. 1A is a perspective view of a motor stator according to a first embodiment.

Embodiments will be described with reference to the accompanying drawings. Note that in the following description, an inner-diameter direction, an outer-diameter direction, a circumferential direction, and an axial direction (a vertical direction) are defined with reference to a center line C of the motor stator. Some of the reference numerals given to the same shape will be omitted as appropriate.

First Embodiment

With reference to FIG. 1A and FIG. 2, a motor motor-stator main body 10 is built in a power steering device of a vehicle, a compressor, or a motor pump, etc. The motor-stator main body 10 includes a core 11 formed of a large number of laminated magnetic steel sheets, a first insulator 20 that covers the upper portion of the core 11, a second insulator 30 that covers the lower portion of the core 11, first coils U1, V1, and W1, second coils U2, V2, and W2, and third coils U3, V3, and W3 which are provided on the first insulator 20 and on the second insulator 30, and a first internal terminal 15 to a third internal terminal 17 that are attached to the first insulator 20. The first internal terminal 15 to the third internal terminal 17 are connected to a circuit board (unillustrated). The motor-stator main body 10 is sealed by a sealing member. A sealing process will be described later.

With reference to FIG. 2, the core 11 includes an annular yoke 12, and nine teeth 13 extended in the inner-diameter direction from the yoke 12. Each tip 13a of each tooth 13 has a width that increases in the circumferential direction toward the inner-diameter direction. The yoke 12 includes external edge portions 12a protruding in the outer-diameter direction.

The first insulator 20 includes a first annular member 21 capable of covering the upper portion of the yoke 12, nine first wind portions 22 each capable of covering the half of each tooth 13, nine first elongated-wall portions 23 (extended portions) which are extended upwardly along the axial direction from a top surface 21c of the first annular member 21, and which are provided intermittently in the circumferential direction, and nine first short-wall portions 24 each provided between the adjoining first elongated-wall portions 23 and having a shorter dimension in the circumferential direction than that of the first elongated-wall portion 23.

The second insulator 30 includes a second annular member 31 capable of covering the lower portion of the yoke 12, nine second wind portions 32 each capable of covering the lower portion of each tooth 13, and nine second wall portions 33 extended downwardly along the axial direction from the second annular member 31.

Figure 1B:
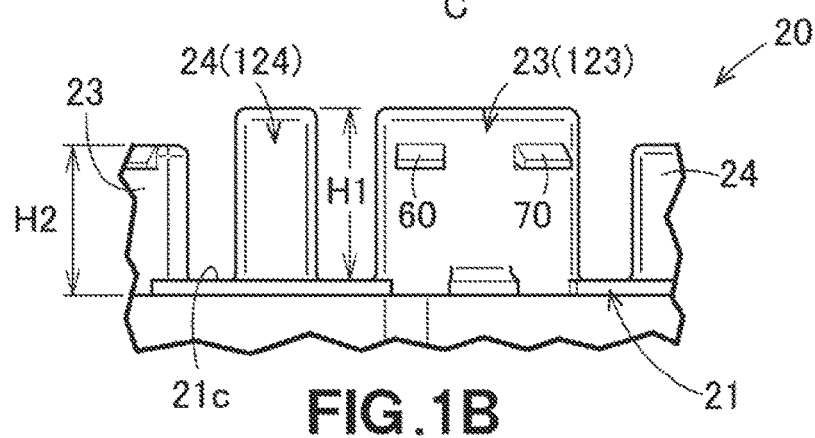
FIG. 1B is a diagram as viewed along an arrow b in FIG. 1A.

With reference to FIG. 1B, among the nine first elongated-wall portions 23, there is a first elongated-wall portion 123 that has a longer dimension in the direction of the center line C than those of the other first elongated-wall portions 23. Similarly, among the nine first short-wall portions 24, there is a first short-wall portion 124 that has a longer dimension in the direction of the center line C than those of the other first short-wall portions 24. The first elongated-wall portion 123 and the first short-wall portion 124 adjoin to each other, and have the dimensions consistent with each other. A height H1 of the first elongated-wall portion 123 and first short-wall portion 124 is higher than a height H12 of the other elongated-wall portions 23 and short-wall portions 24 (H1>H2).

The first elongated-wall portion 123 and the first short-wall portion 124 are located at the substantial center in the circumferential direction between the external edge portions 12a and 12a of the yoke 12 which adjoin to each other in the circumferential direction.

A structure of the first elongated-wall portion 23 located at the outer-diameter side of the coil U3 in the first insulator 20 will be described below.

With reference to FIG. 3A, the first elongated-wall portion 23 includes a first guide surface 51 (guide surface) that guides three strings of the winding 40 in the circumferential direction, and a second guide surface 52 that guides one string among the three strings of the winding 40 in the inner-diameter direction. The second guide surface 52 is a surface which adjoins to the first guide surface 51 and which guides the winding 40 from the first guide surface 51 to a wind portion 90 to be described later.

Among the three strings of the winding 40, the two upper and lower strings of the winding 40 and 40 are two crossover wires 41 and 42 which are drawn out from one coil among the coil U1 to the coil W3 (see FIG. 1A), and which are guided by the first guide surface 51 directed toward the other coil. The winding 40 located between the crossover wires 41 and 42 is a winding string 43 which is drawn out from one coil among the coil U1 to the coil W3, is guided by the first guide surface 51, is drawn in the inner-diameter direction from the second guide surface 52, and forms the coil U3.

Provided at an upper end 51a of the first guide surface 51 are a first protruding portion 60 and a second protruding portion 70 both protruding in the outer-diameter direction. The dimension of first protruding portion 60 in the circumferential direction is, for example, substantially ⅓ of the dimension of the first guide surface 51 in the circumferential direction. A gap between the first protruding portion 60 and the second protruding portion 70 is, for example, substantially ⅓ of the dimension of the first guide surface 51 in the circumferential direction. Note that the number of protruding portions may be one, or equal to or greater than three.

A first groove 21a is formed in the annular member 21 below the first protruding portion 60. A second groove 21b is formed in the annular member 21 below the second protruding portion 70.

With reference to FIG. 3A and FIG. 3B, the first protruding portion 60 includes a main-body portion 61 in a cuboid shape, and a convex portion 62 extended downwardly from a tip 61a of the main-body portion 61 at the outer-diameter side. The main-body portion 61 and the convex portion 62 are formed integrally with each other. A top surface 60a of the first protruding portion 60 is located on the same plane as a top surface 23a of the first elongated-wall portion 23.

A bottom surface 63 of the first protruding portion 60 is an abutting surface capable of abutting the three strings of the winding 40 guided by first guide surface 51. The bottom surface 63 is a surface directed downwardly in the opposite side to the upward direction in which the first elongated-wall portion 23 is extended. More specifically, the bottom surface 63 includes a curved portion 64 that is curved so as to expand upwardly, and a flat portion 65 located at the outer-diameter side relative to the curved portion 64.

The curved portion 64 includes an external slant portion 66 that goes downwardly toward the outer-diameter direction from a top point P, and an internal slant portion 67 that goes downwardly toward the inner-diameter direction from the top point P. The external slant portion 66 is a surface capable of abutting a semicircle portion 40a of the winding 40 with a circular cross-sectional shape at the outer-diameter side.

Note that the cross-sectional shape of the winding 40 is not limited to a circle but may not be a polygonal shape. Moreover, as illustrated in FIG. 3B, the curved portion 64 may employ a structure that can hold the winding 40 from both sides thereof to retain, or may employ a structure capable of retaining the winding 40 without contacting both ends of the winding 40 (unillustrated).

Furthermore, although the bottom surface 63 is formed by the two surfaces that are the curved portion 64 and the flat portion 65 in this embodiment, for example, the bottom surface 63 may be a single flat surface that goes downwardly toward the outer-diameter direction from the first guide surface 51.

The second protruding portion 70 is formed in the same dimension and shape as those of the first protruding portion 60, and includes a bottom surface 73 capable of abutting the three strings of the winding 40. The description for the other structures of the second protruding portion 70 will be omitted. The first protruding portion 60 and the second protruding portion 70 are also formed in the other first elongated-wall portions 23 illustrated in FIG. 1A.

Figure 4:
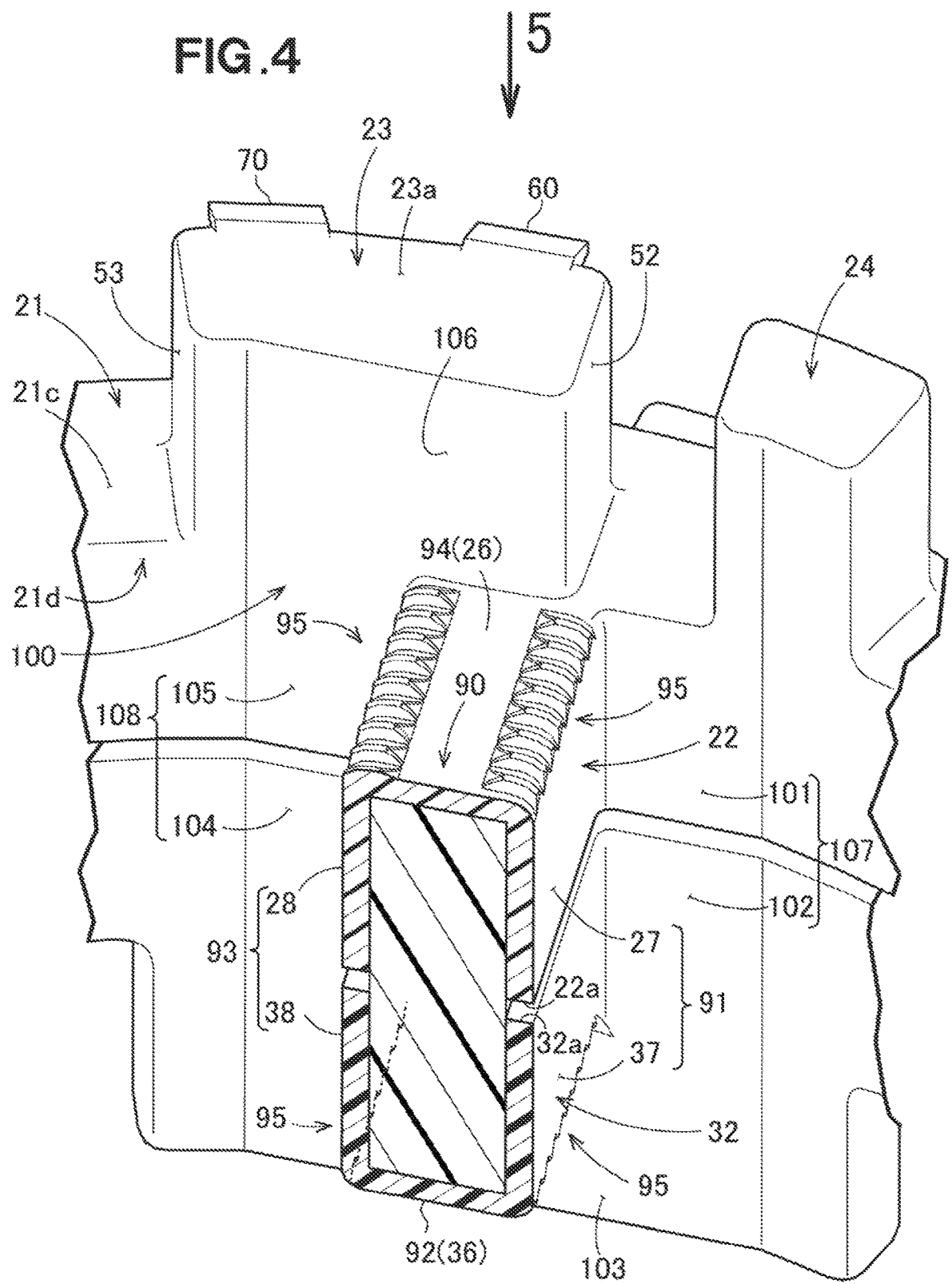
FIG. 4 is a diagram for describing the extended portion of the motor stator and a wind portion thereof illustrated in FIG. 1A.

With reference to FIG. 4, a portion where the coil U3 is formed will be described next. The first wind portion 22 of the first insulator 20 and the second wind portion 32 of the second insulator 30 form a wind portion 90 around which a winding string 43 (see FIG. 3) is wound.

The first wind portion 22, and the second wind portion 32 are each formed in a U-shaped cross-sectional shape. A tip 22a of the first wind portion 22 at the opening side and a tip 32a of the second wind portion 32 at the opening side facing with each other but are slightly apart from each other.

Note that although the two wind portions 22 and 32 are combined to each other according to the embodiment, for example, depending on the shape of the core 11 (see FIG. 2), a single wind portion that can be fitted in a tooth 13 may be formed.

A top surface 26 of the first wind portion 22 and a pair of first right surface 27 and first left surface 28 extended downwardly from both ends of this top surface 26, respectively, are surfaces with which the winding string 43 contacts. Similarly, a bottom surface 36 of the second wind portion 32 and a pair of second right surface 37 and second left surface 38 extended upwardly from both ends of the bottom surface 36, respectively, are surfaces with which the winding string 43 contacts.

To facilitate understanding, the surface that includes the first right surface 27 and the second right surface 37 will be defined as a first wind surface 91 (a side surface). Similarly, the bottom surface 36 will be defined as a second wind surface 92, a surface that includes the first left surface 28 and the second left surface 38 will be defined as a third wind surface 93 (a side surface), and the top surface 26 will be defined as a fourth wind surface 94 (an end surface). The first wind surface 91 and the third wind surface 93 are directed oppositely to each other in the circumferential direction. The first wind surface 92 is directed downwardly. The fourth wind surface 94 is directed upwardly. The winding string 43 is to be wound around the first wind surface 91 to the fourth wind surface 94 in this sequence.

Guide grooves 95 capable of guiding the winding string 43 to be wound are provided at respective boundaries among the first wind surface 91 to the fourth wind surface 94 that form the wind portion 90.

With reference to FIG. 4 and FIG. 5A, an inner circumference surface 21d of the annular member 21 includes a holding surface 100 which abuts the end portion of the coil U3 at the outer-diameter side and which is capable of holding the shape of the coil U3. This holding surface 100 is formed as a flat surface.

The holding surface 100 includes a first right holding surface 101 orthogonal to the first right surface 27, a second right holding surface 102 orthogonal to the second right surface 37, a bottom holding surface 103 orthogonal to the bottom surface 36, a second left holding surface 104 orthogonal to the second left surface 38, a first left holding surface 105 orthogonal to the first left surface 28, and a top holding surface 106 orthogonal to the top surface 26.

The top holding surface 106 is also a surface at the opposite side to the first guide surface 51 of the first elongated-wall portion 23. A surface that includes the first right holding surface 101 and the second right holding surface 102 will be defined as a right holding surface 107. A surface that includes the first left holding surface 105 and the second left holding surface 104 will be defined as a left holding surface 108.

With reference to FIG. 5B, a boundary between the right holding surface 107 and the first wind surface 91 (a side surface) will be defined as a first corner 111. A boundary between the first guide surface 51 and the second guide surface 52 will be defined as a second corner 112. The first corner 111 is located in a clockwise-direction side (a guiding-direction side by the first guide surface 51, see an arrow F (FIG. 5A)) relative to the second corner 112.

The second guide surface 52 is in parallel with the first wind surface 91. A dimension L from the second guide surface 52 to the first wind surface 91 in the circumferential direction is equal to a wire diameter D of the winding string 43.

How to wind the winding string 43 that forms the coil U3 will be described. The winding string 43 that is guided clockwise along the first guide surface 51 is bent in the inner-diameter direction toward the wind portion 90 with the second corner 112 being as an origin. The bent winding string 43 is drawn in toward the first corner 111, and is bent further downwardly with the first corner 111 being as an origin. Subsequently, the winding string 43 is wound from the first wind surface 91 to the fourth wind surface 94 in this sequence.

With reference to FIG. 6, the motor-stator main body 10 is sealed by a sealing member formed of a resin.

First, a metal mold 190 utilized for a sealing process will be described.

A cavity of the metal mold 190 in which the motor-stator main body 10 is placed is formed in a cylindrical shape. Nine convex portions 192 that protrude upwardly from a bottom 191 is provided on the bottom 191 of the metal mold 190 so as to have a gap therebetween in the circumferential direction. Each convex portion 192 is capable of supporting the tip 22a of the first insulator 20 at the internal-diameter side (see FIG. 2).

Moreover, four columnar portions 194 that extend upwardly along an inner circumference surface 193 of the metal mold 190 are provided on the bottom 191 so as to have a gap therebetween in the circumferential direction. Each columnar portion 194 is capable of supporting the external edge portion 12a of the yoke 12.

Furthermore, a first pin 196 to a third pin 198 for partially forming a hollow in the sealing member are provided on the bottom 191.

Next, the sealing process for the motor-stator main body 10 by this metal mold 190 will be described. First of all, the first external terminal 131 to the fourth external terminal 134 are placed on the bottom 191 of the metal mold 190. The first pin 196 to the third pin 198 are provided between the first external terminal 131 to the fourth external terminal 134 adjacent to each other, respectively.

Next, the motor-stator main body 10 is placed in the metal mold 190 in such a way that the respective tips of the first pin 196 to the third pin 198 face the first elongated-wall portions 123 of the first insulator 20 and the first short-wall portions 124 thereof. Subsequently, a resin is filled in the cavity of the metal mold 190 for sealing.

Figure 7:
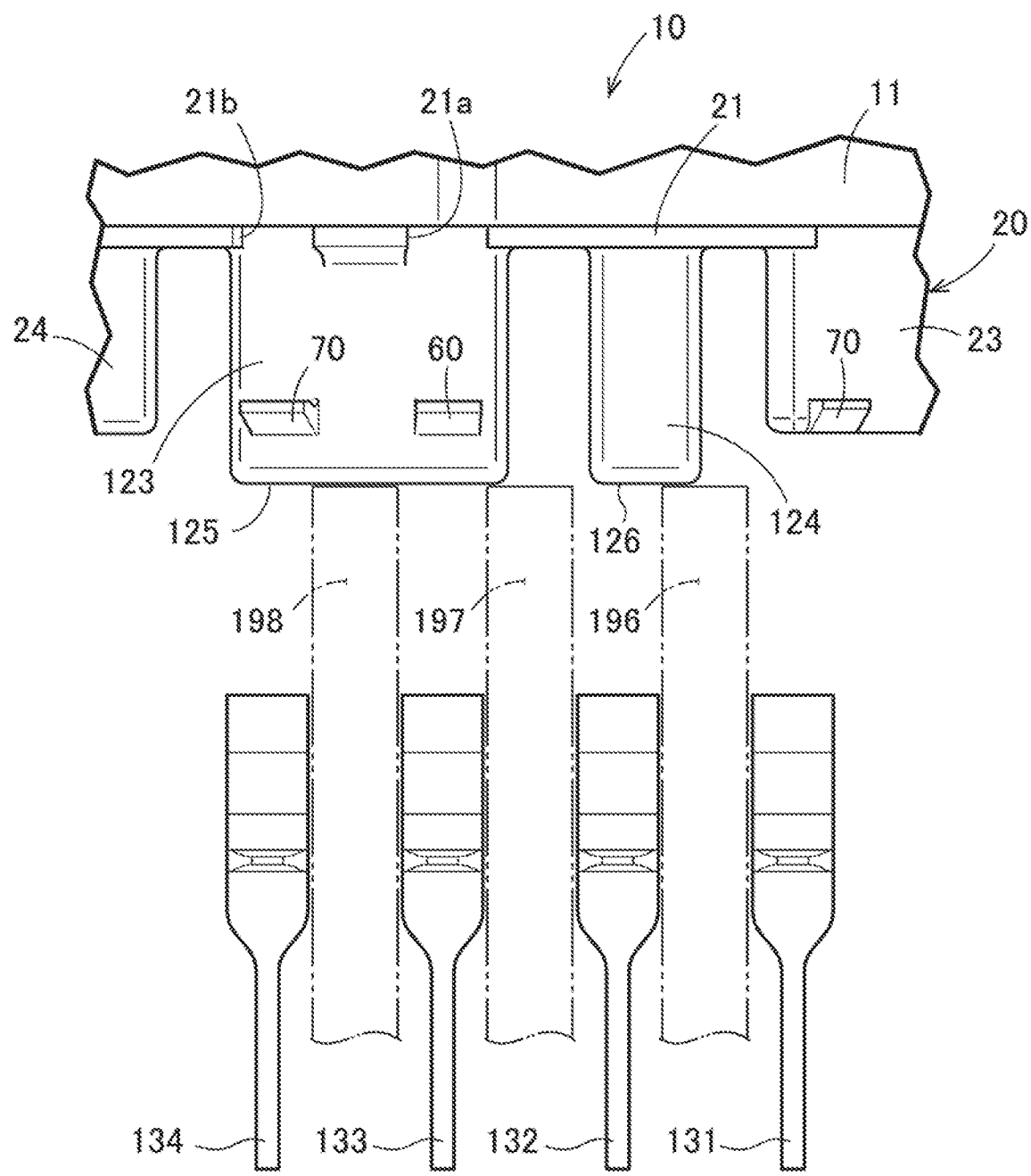
FIG. 7 is a diagram for describing a structure with respect to a motor-stator main body and a pin of a metal mold with the motor stator being placed on a metal mold.

With reference to FIG. 7, when the motor-stator main body 10 is placed in the metal mold 190, a tip surface 125 of the first elongated-wall portion 123 abuts the second pin 197 and the third pin 198. A tip surface 126 of the first short-wall portion 124 abuts the first pin 196. That is, when the motor-stator main body 10 is placed in the metal mold 190, the motor-stator main body 10 is supported by the first pin 196 to the third pin 198.

Figure 8:
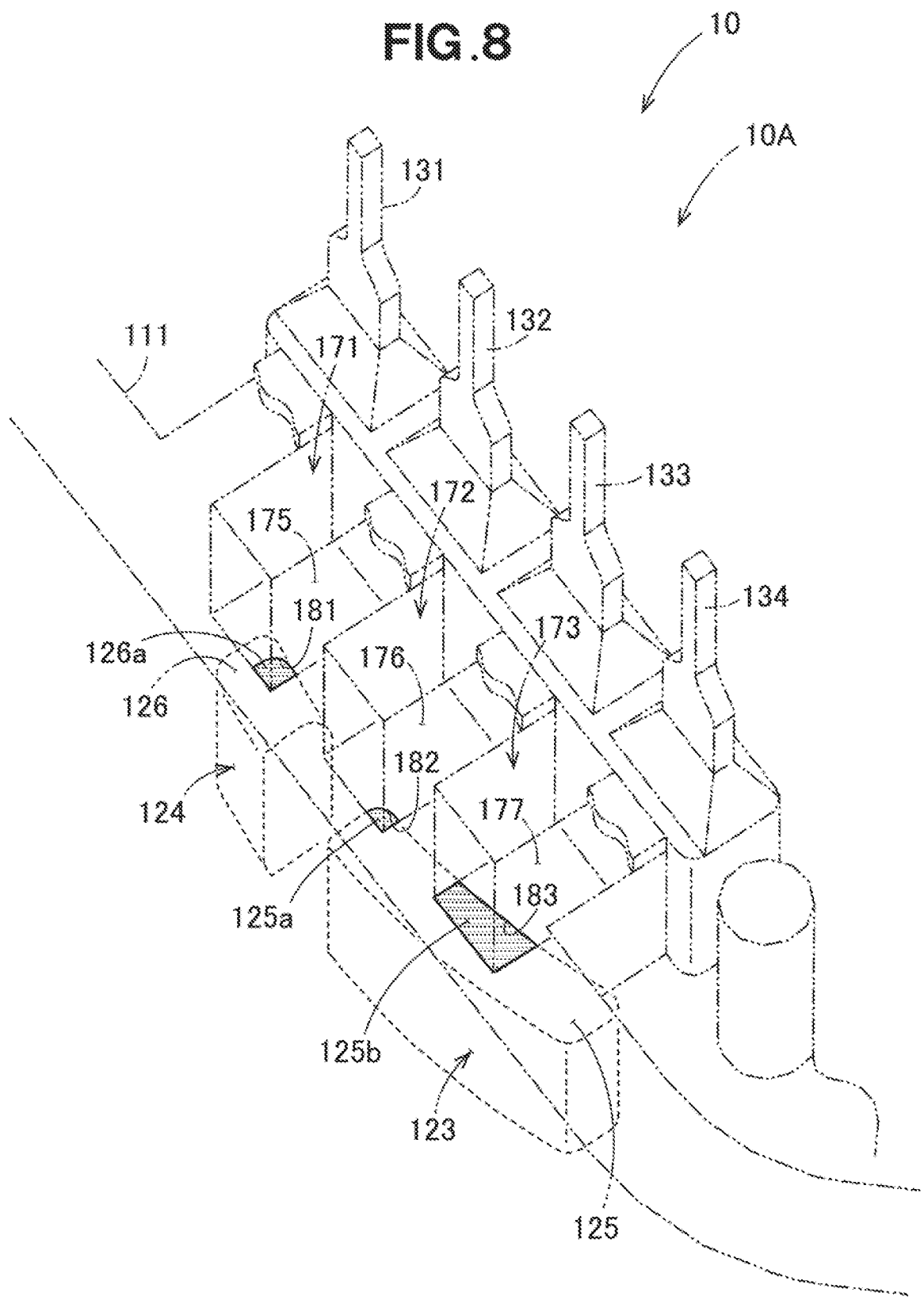
FIG. 8 is a perspective view around an external terminal of the motor sealed by the sealing member.

FIGS. 8 and 9 illustrate a part of a motor stator 10A that is the motor-stator main body 10 sealed by a sealing member 111.

The sealing member 111 is provided with a first hollow opening 171 to a third hollow opening 173 between the first external terminal 131 to the fourth external terminal 134 adjacent to each other, respectively. The first hollow opening 171 to the third hollow opening 173 are formed in a rectangular columnar shape, and are extended along the center line C of the motor-stator main body 10.

The first hollow opening 171 corresponds to a region occupied by the first pin 196 (see FIG. 7) at the time of the sealing process. The second hollow opening 172 corresponds to a region occupied by the second pin 197 at the time of sealing process. The third hollow opening 173 corresponds to a region occupied by the third pin 198 at the time of the sealing process.

A first bottom 175 of the first hollow opening 171 is partially provided with a first through-hole 181 that passes completely through. The first through-hole 181 is closed by the tip surface 126 of the first short-wall portion 124.

Similarly, a second bottom 176 of the second hollow opening 172 is partially provided with a second through-hole 182 that passes completely through. A third bottom 177 of the third hollow opening 173 is provided with a third through-hole 183 that passes completely through. The second through-hole 182 and the third through-hole 183 are closed by the tip surface 125 of the first elongated-wall portion 123.

In other words, an exposed portion 126a that is a part of the tip surface 126 is exposed from the first through-hole 181. An exposed portion 125a that is a part of the tip surface 125 is exposed from the second through-hole 182. An exposed portion 125b that is also a part of the tip surface 125 is exposed from the third through-hole 183.

Next, advantageous effects according to the first embodiment will be described.

With reference to FIG. 10A, in a motor stator according to a comparative example, a first corner 201 is located at a counterclockwise-direction side (see an arrow R) relative to a second corner 202. Hence, when a winding 203 is about to be wound around a wind portion 205, the winding 203 contacts a corner 208 between a second guide surface 206 and an upper holding surface 207. Because a winding start portion 209a of the winding at the first stage forming a coil 209 is not intimately in contact with a first wind surface 205a, there is a clearance CL between the winding 203 and the first wind surface 205a.

With reference to FIG. 10B, in the motor-stator main body 10 according to the first embodiment, the first corner 111 is located in the clockwise-direction side (see an arrow F) relative to the second corner 112. Hence, the winding string 43 is drawn in the inner-diameter direction, and is extended to the first corner 111 from the second corner 112, a contact between the winding string 43 and the first elongated-wall portion 23 is avoidable. Subsequently, when the winding string 43 is about to wound around the wind portion 90, the winding string 43 can contact not only the right holding surface 107 but also the first wind surface 91. That is, the winding start portion of the winding string 43 at the first stage forming the coil U3 can be intimately in contact with the wind portion 90, and the entire winding string 43 at the first stage is surely wound around the wind portion 90. Consequently, the space factor of the winding string 43 is improved.

With reference to FIG. 5B, the dimension L from the second guide surface 52 to the first wind surface 91 in the circumferential direction is equal to the wire diameter D of the winding string 43. Note that it is desirable that the dimension L should be greater than the half of the wire diameter D of the winding string 43 and be smaller than a dimension obtained by subtracting the wire diameter D from the half of a width (a dimension in the circumferential direction) Wd of the fourth wind surface 94 (an end surface) in the winding direction. Such a predetermined dimension avoids an interference between a drawn string 44 (see FIG. 3A) drawn out from the coil U3 and the winding string 43.

Second Embodiment

Figure 11A:
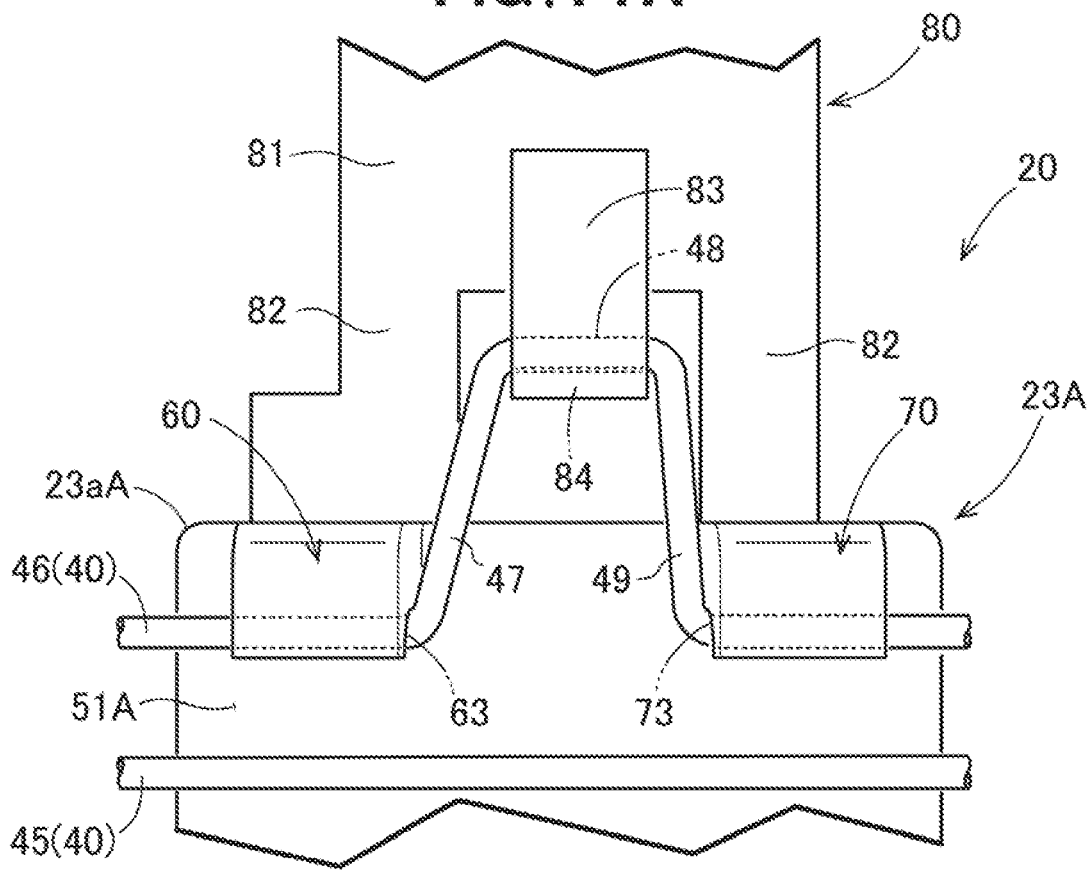
FIG. 11A is a diagram for describing an extended portion of a motor stator and a terminal thereof according to a second embodiment.
Figure 11B:
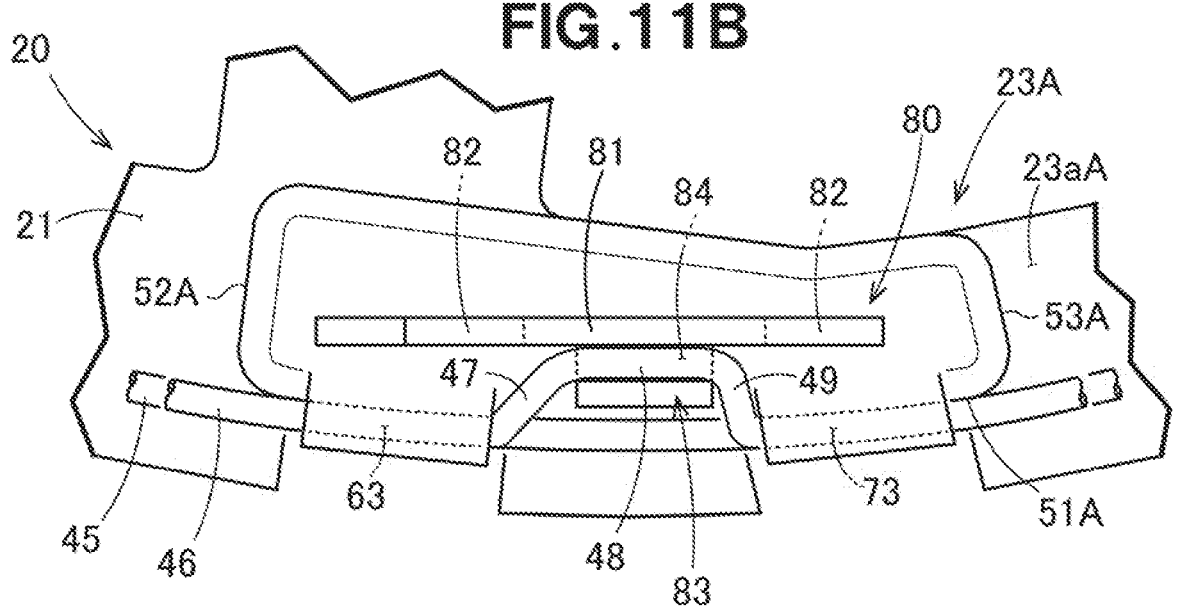
FIG. 11B is a diagram of the extended portion and the terminal illustrated in FIG. 11A as viewed along an along axial direction.

Next, with reference to FIGS. 11A and 11B, a second embodiment will be described. In comparison with the first embodiment, according to the second embodiment, a first elongated-wall portion 23A and an internal terminal 80 are different.

The dimension of the first elongated-wall portion 23A in the circumferential direction is greater than the dimension of the first elongated-wall portion 23 of the first embodiment in the circumferential direction. More specifically, the dimension of the first elongated-wall portion 23A in the circumferential direction is substantially equal to the dimension of the annular member 21 (see FIG. 2) of the first insulator 20 that is divided into nine portions in the circumferential direction. The same structure as that of the first embodiment will be denoted by the same reference numeral, and the description thereof will be omitted.

The first elongated-wall portion 23A includes a first guide surface 51A that guides the two strings of the winding 40 in the circumferential direction, and second guide surface 52A and third guide surface 53A which are extended in the inner-diameter direction from both ends of the first guide surface 51A in the circumferential direction, respectively. The second guide surface 52A and the third guide surface 53A are guide surfaces which guide the winding 40 in the inner-diameter direction.

The first guide surface 51A includes a first protruding portion 60 (one protruding portion) and a second protruding portion 70 (another protruding portion). The string extended linearly in the two strings of the winding 40 guided by the first guide surface 51A will be defined as a crossover wire 45, and a string which is partially bent and which is connected to the internal terminal 80 will be defined as a connection wire 46.

The internal terminal 80 is formed in a thin-plate shape that has a thin dimension in the diameter direction, and includes a rectangular main-body portion 81, two fitting portions 82 which are extended downwardly from the lower portion of the main-body portion 81, and which are fitted in a top surface 23Aa of the first elongated-wall portion 23A, and a fold-back portion 83 which is located between the two fitting portions 82 and which is folded back from the lower portion of the main-body portion 61 and toward the upward direction.

The fold-back portion 83 includes a holding portion 84 that is electrically connected to the connection wire 46 by holding the connection line 46 therein. An example connection scheme is fusing.

The connection wire 46 abuts a bottom surface 63 of the first protruding portion 60, the holding portion 84, and a bottom surface 73 of the second protruding portion 70. More specifically, the connection wire 46 includes a first slant portion 47 that extends obliquely from the first protruding portion 60 to the holding portion 84, a parallel portion 48 that extends in parallel with the top surface 23Aa in the holding portion 84, and a second slant portion 49 that extends obliquely to the second protruding portion 70 from the lower portion of the fold-back portion 83.

The holding portion 84 is located between, in the circumferential direction, the first protruding portion 60 and the second protruding portion 70, and is shifted toward the second protruding portion 70. Note that the holding portion 84 is not limited to a case in which it is located within a region between the first protruding portion 60 and the second protruding portion 70, but may be located at the outer-diameter side or the inner-diameter side relative to such a region.

Note that the present disclosure is not limited to the above embodiments as long as the action and advantageous effect of the present disclosure are achievable.

What is claimed is:

1. A motor stator comprising:
a core;
an insulator covering the core; and
a coil formed by a winding wound around the insulator,
wherein the core comprises: an annular yoke, and a tooth extended from the yoke in an inner-diameter direction of the motor stator,
the insulator comprises: an annular member covering the yoke; a wind portion which covers the tooth and around which the winding is wound;
and an extended portion extended from the annular member in an axial direction of the motor stator,
wherein an inner circumference surface of the annular member comprises a holding surface which abuts an end portion of the coil and which is capable of holding a shape of the coil,
wherein the extended portion comprises: a first guide surface guiding the winding in a circumferential direction of the motor stator; and a second guide surface which adjoins to the first guide surface and which guides the winding from the first guide surface to the wind portion,
wherein the wind portion comprises: a side surface at a same side as the second guide surface in the circumferential direction; and an end surface orthogonal to the side surface,
wherein a first corner of the winding is formed at a boundary between the holding surface and the side surface, as viewed in the axial direction of the motor stator, and is located at a guiding-direction side by the first guide surface relative to a second corner of the winding, which is formed at a boundary between the first guide surface and the second guide surface, and
wherein the winding extends directly from the second corner to the first corner so as to be entirely on the same side, in the circumferential direction, as the second guide surface and the side surface.

2. A motor stator comprising:
a core;
an insulator covering the core; and
a coil formed by a winding wound around the insulator,
wherein the core comprises: an annular yoke, and a tooth extended from the yoke in an inner-diameter direction of the motor stator,
the insulator comprises: an annular member covering the yoke; a wind portion which covers the tooth and around which the winding is wound; and an extended portion extended from the annular member in an axial direction of the motor stator,
wherein an inner circumference surface of the annular member comprises a holding surface which abuts an end portion of the coil and which is capable of holding a shape of the coil,
wherein the extended portion comprises: a first guide surface guiding the winding in a circumferential direction of the motor stator; and a second guide surface which adjoins to the first guide surface and which guides the winding from the first guide surface to the wind portion,
wherein the wind portion comprises: a side surface at a same side as the second guide surface in the circumferential direction; and an end surface orthogonal to the side surface,
wherein a first corner formed at a boundary between the holding surface and the side surface as viewed in the axial direction of the motor stator is located at a guiding-direction side by the first guide surface relative to a second corner formed at a boundary between the first guide surface and the second guide surface,
wherein the winding is extended from the second corner to the first corner;
the second guide surface is in parallel with the side surface of the wind portion; and
a dimension in the circumferential direction from the second guide surface to the side surface is greater than a half of a wire diameter of the winding, and is smaller than a dimension obtained by subtracting the wire diameter from a half dimension of the end surface in the circumferential direction.

\* \* \* \* \*